Oct. 25, 1960
H. S. ROSS
2,957,703
INERTIA RESPONSIVE SHOCK ABSORBER
ARRANGEMENT FOR VEHICLE
Filed Aug. 16, 1956
5 Sheets-Sheet 1
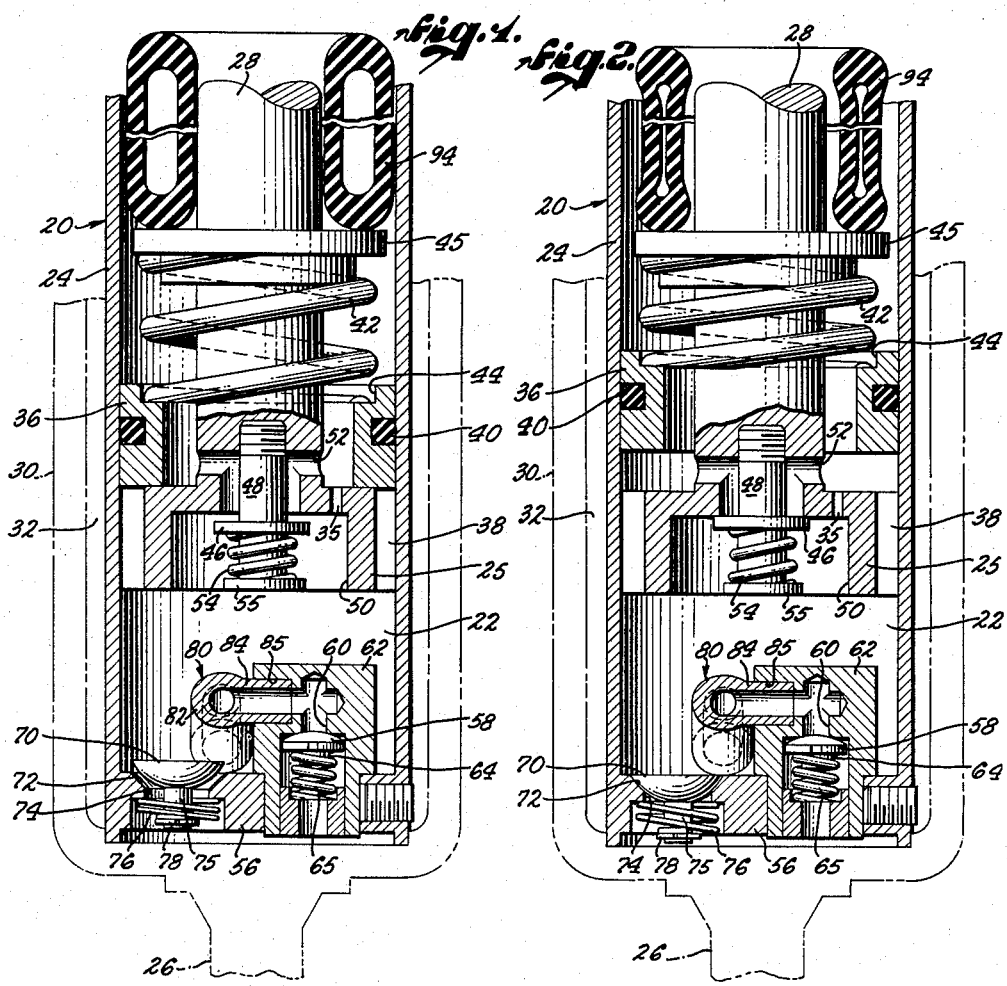
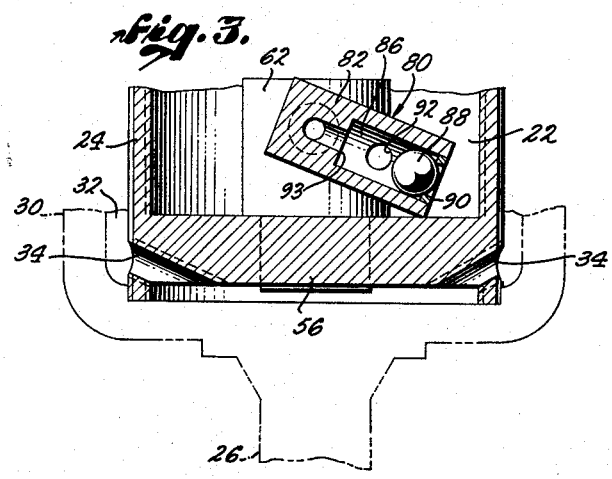
HOWARD S. ROSS,
INVENTOR.
BY *George N. Smyth*
ATTORNEY.

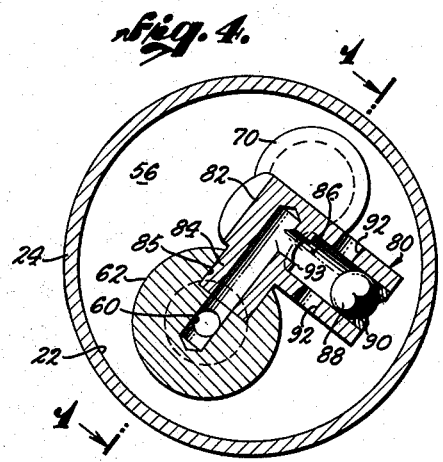
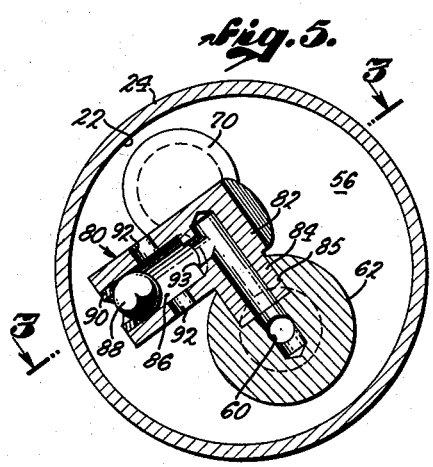
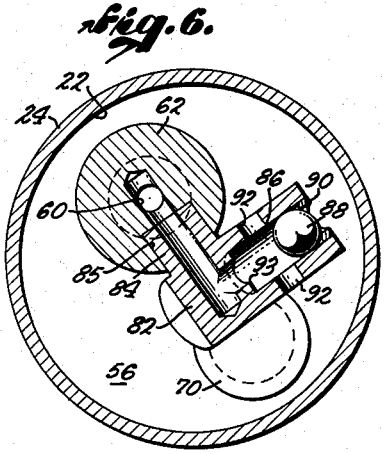
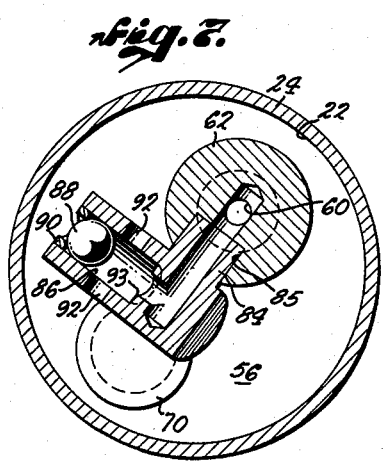
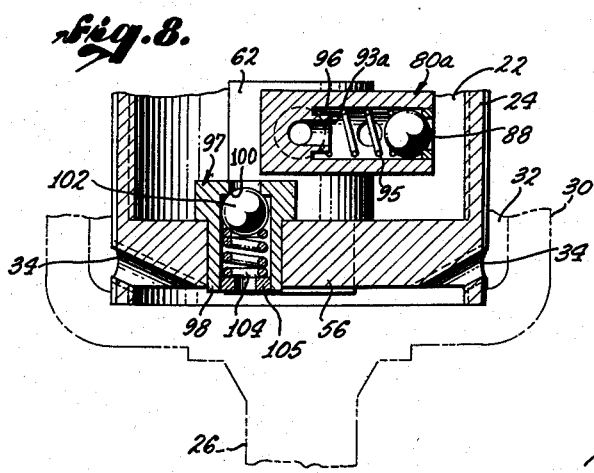

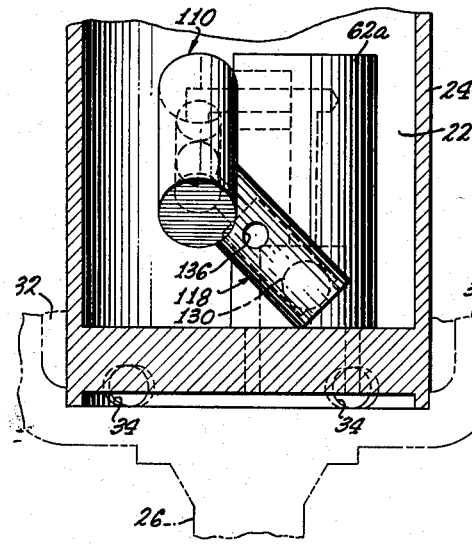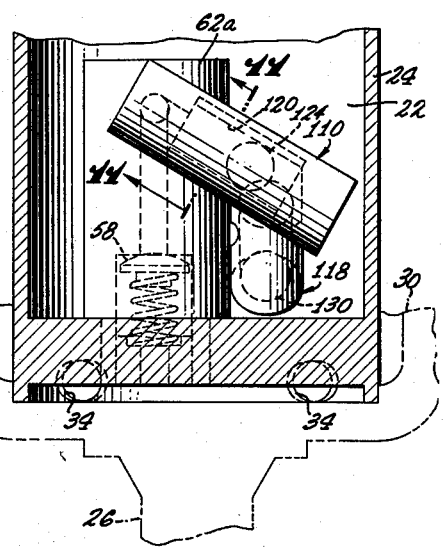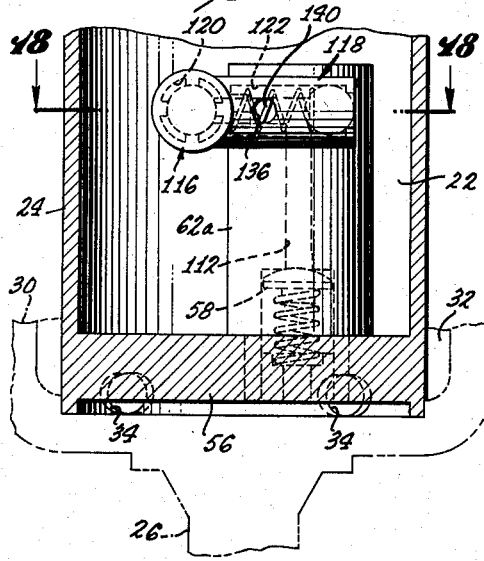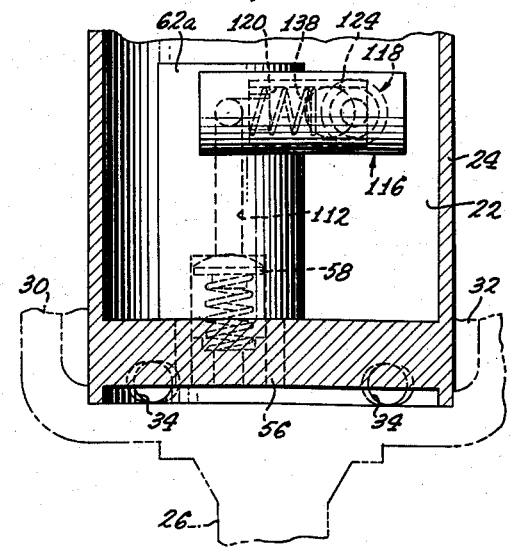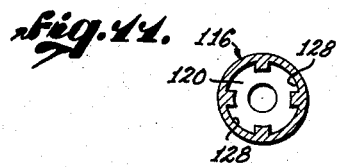

Oct. 25, 1960
H. S. ROSS
2,957,703
INERTIA RESPONSIVE SHOCK ABSORBER
ARRANGEMENT FOR VEHICLE
Filed Aug. 16, 1956
5 Sheets-Sheet 4
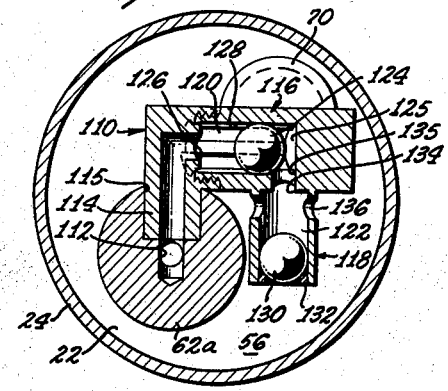
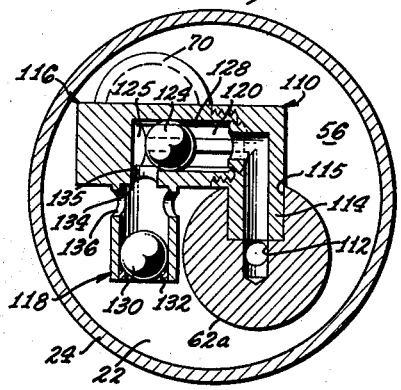
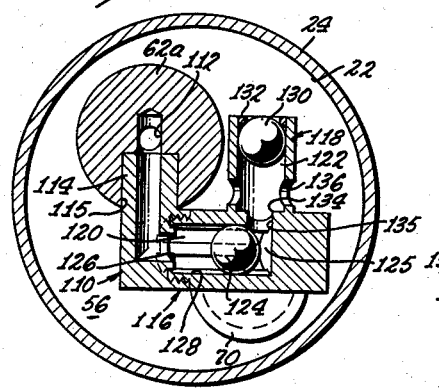
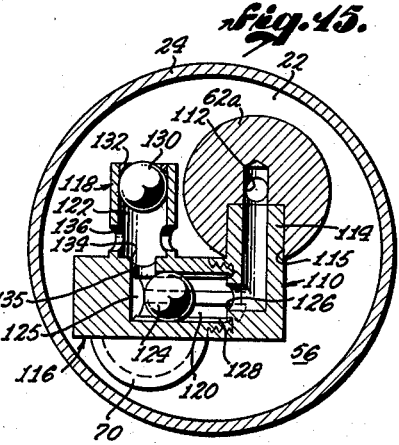
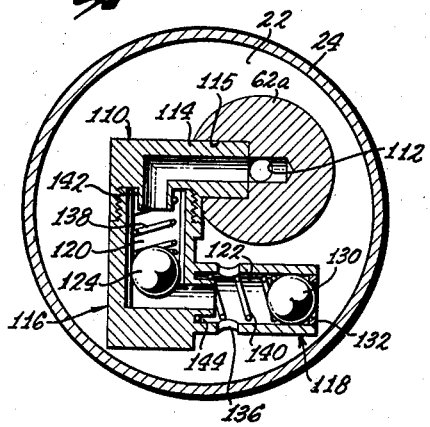
HOWARD S. ROSS,
INVENTOR.
BY
ATTORNEY.

Oct. 25, 1960
H. S. ROSS
2,957,703
INERTIA RESPONSIVE SHOCK ABSORBER
ARRANGEMENT FOR VEHICLE
Filed Aug. 16, 1956
5 Sheets-Sheet 5
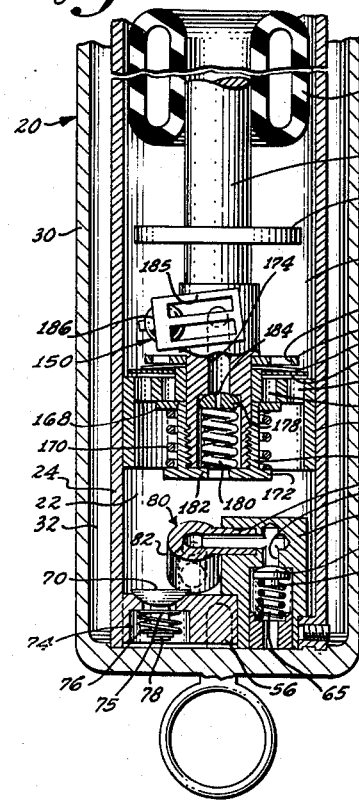
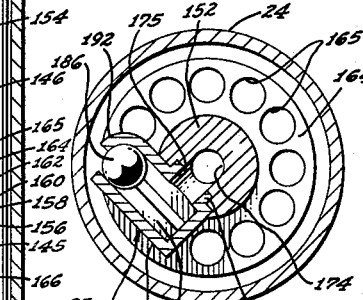
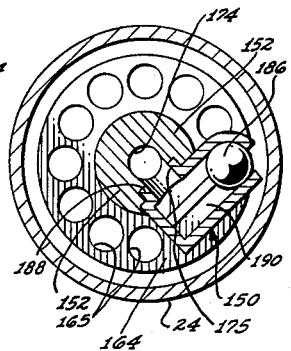
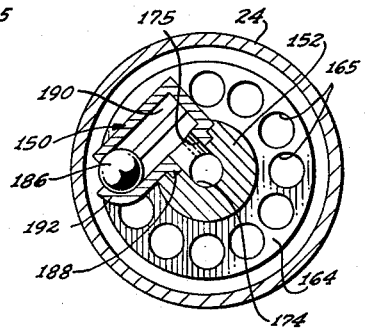
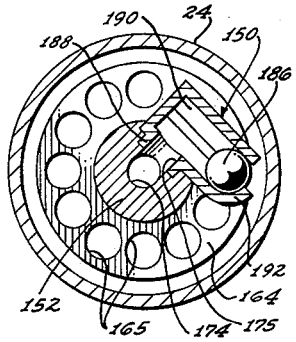
INVENTOR:
Howard S. Ross
By Smyth Rostou
Attorneys

2,957,703

INERTIA RESPONSIVE SHOCK ABSORBER ARRANGEMENT FOR VEHICLE

Howard S. Ross, 347 Buchanan St., Twin Falls, Idaho

Filed Aug. 16, 1956, Ser. No. 604,561

20 Claims. (Cl. 280—124)

This invention relates to shock absorbers for resisting excessive lateral and longitudinal swaying of vehicles. The present invention is a continuation-in-part of my copending application Serial Number 558,756, filed January 12, 1956, and entitled, Vehicle Shock Absorber, now abandoned.

It is well known that a shock absorber acting between a vehicle body and a wheel axle must yield freely to absorb normal road shocks effectively and that "soft" riding can be achieved only by highly responsive shock absorber action. On the other hand, the greater the yieldability of the four shock absorbers of a vehicle, the more vulnerable the vehicle to sway longitudinally and laterally in response to inertia. Thus the more sensitive the shock absorbers, the more the vehicle body sways back or "squats" when suddenly and severely accelerated, the more the vehicle dips forward or "nose dives" when suddenly and severely decelerated, and the more the vehicle sways outward by centrifugal force on curves. Because of these conflicting considerations the degree of resistance to force of the shock absorbers of a vehicle is usually a compromise, the compromise degree of resistance to forces being higher than optimum for soft riding but less than necessary to eliminate undesirable responses to sudden starts, stops and changes in direction.

The present invention meets this general problem by a shock absorber construction that automatically increases its resistance to force in response to the same inertia that tends to sway the vehicle longitudinally or laterally. With such automatic action the shock absorbers are normally highly yieldable to shock forces for soft riding during straight ahead driving and yet stiffen automatically to reduce undesirable body sway arising from inertia.

In the present invention, the stiffening action in response to inertia is achieved by providing each of the four shock absorbers with a valve that is normally open and is movable by inertia to a flow-restricting or closed position to limit the fluid flow in the shock absorber that is involved in the local downward movement of the vehicle body relative to the corresponding wheel axle. Each of these valves is inertia-responsive in a selected quadrant of directions to achieve the desired automatic resistance to lateral and longitudinal swaying of the vehicle body.

In the preferred practices of the present invention, the selectively responsive valve of the shock absorber comprises a fluid passage and a valve member therein in the form of a ball that is movable longitudinally of the fluid passage between a first normal open position and a second closed or flow-restricting position. The ball is biased to seek its normal open position in the absence of inertia. In some practices of the invention, the biasing is accomplished by providing suitable spring means to act against the ball. In other practices of the invention, the fluid passage in which the ball moves is inclined for gravitational biasing of the ball towards its normal open position.

In some practices of the invention, the selectively responsive valve comprises a fluid passage with a single valve member therein and this fluid passage is oriented relative to the longitudinal axis of the vehicle in a quadrant of directions for response to inertia forces both longitudinally and laterally of the vehicle. In other practices of the invention, the fluid passage of the shock absorber is angular with a first portion extending in one direction and a second portion extending in a direction approximately 90° therefrom. This angular passage is so oriented relative to the longitudinal axis of the vehicle that a valve means in one portion of the fluid passage responds to inertia forces longitudinally of the vehicle and a second valve means in the other portion of the fluid passage responds to inertia forces laterally of the vehicle.

In a typical shock absorber wherein a piston operates in an hydraulic cylinder, the piston divides the cylinder into two compartments, one of which is contracted when the shock absorber is shortened and the other of which contracted when the shock absorber is lengthened. The contraction of either or both of these compartments may be controlled by inertia-responsive valve means. In the usual shock absorber construction in which the cylinder is unitary with the lower end of the shock absorber and the piston is unitary with the upper end, inertia control of the shortening of the shock absorber is accomplished by an inertia-responsive valve in the bottom of the cylinder and inertia control of the lengthening of the shock absorber is accomplished by a similar valve in the piston. If the four shock absorbers are mounted in substantially upright positions, inertia control of the shortening action of the shock absorbers is ordinarily of primary importance. On the other hand, if the shock absorbers are greatly inclined inwardly, inertia control of the lengthening of the shock absorber may be of primary importance.

An important feature of the preferred practice of the invention is the creation of a venturi effect to influence the inertia-responsive valve. Thus, the contraction of a shock absorber compartment causes the hydraulic fluid displaced therefrom to flow in such manner as to tend to push the inertia-responsive valve member to a closed position. As will be explained, this flow-responsiveness of the inertia valve may be predetermined for any desired degree of effectiveness in the design of the valve member and the configuration of the associated fluid passage. Preferably the design is such that the valve member is closed by relatively prolonged rapid flow but is not operatively responsive either to exceedingly short rapid flow or relatively slow prolonged flow. In many instances the flow-responsiveness of the valve cooperates with its inertia-responsiveness for a desirable highly rapid valve closing operation. In some instances, the flow-responsiveness alone of the valve member may be relied upon for the valve closing operation. In still other instances the arrangement is such that the flow-responsiveness and the inertia-responsiveness of the valve are opposed and, in effect, cancel each other under conditions where no valve closing action is desired.

A further feature of the preferred practice of the invention is the concept of providing means whereby a hydraulic shock absorber of this type yields under loads of exceptionally high magnitude when such peak loads occur while the shock absorber is stiffened by the closing of the inertia-responsive valve. In one practice of the invention a release valve is added for this purpose, the release valve being in parallel with the inertia-responsive valve and being adapted to open only in response to forces of exceptionally high magnitude. In a second practice of the invention, the same end is achieved by placing a hollow resilient body inside the shock absorber to yield by contraction in volume in response to forces of exceptionally high magnitude. In some instances both the high-pressure release valve and the hollow resilient body are used, the release valve opening after a predetermined degree of compression of the hollow body.

The various features and advantages of the invention may be understood more fully from the following description considered with the accompanying drawings.

In the drawings, which are to be regarded as merely illustrative:

Figure 1 is a fragmentary vertical sectional view of one embodiment of the invention, taken as indicated by the line 1—1 of Figure 4 and showing the shock absorber in the course of its upward expansion movement;

Figure 2 is a similar view showing the shock absorber in the course of its downward contraction movement;

Figure 3 is a fragmentary sectional view taken as indicated by the line 3—3 of Figure 5;

Figure 4 is a transverse sectional view showing the orientation of the inertia responsive valve in the left-front shock absorber of a vehicle;

Figures 5, 6 and 7 are similar views of the right-front, left-rear and right-rear shock absorbers, respectively;

Figure 8 is a sectional view similar to Figure 3 showing a modification of the first embodiment of the invention;

Figure 9 is a fragmentary sectional view of a second embodiment of the invention showing the valve therein in side elevation, the valve having a fluid passage with two portions thereof at an angle to each other;

Figure 10 is a similar sectional view taken at 90° from the view in Figure 9;

Figure 11 is a transverse sectional view of the valve passage taken as indicated by the line 11—11 of Figure 10;

Figure 12 is a transverse sectional view showing the orientation of the angular valve passage in the left-front shock absorber of the second embodiment of the invention;

Figures 13, 14 and 15 are similar views of the right-front, left-rear, and right-rear shock absorbers, respectively, of the second embodiment of the invention;

Figure 16 is a view similar to Figure 9 showing a modification of the second embodiment of the invention wherein spring means are used for valve biasing, the inertia-responsive valve being shown in side elevation;

Figure 17 is a similar view taken at 90° from the view shown in Figure 16;

Figure 18 is a transverse section taken as indicated by the line 18—18 of Figure 16 showing the orientation of the angular valve passage of the left-front shock absorber;

Figure 19 is a fragmentary vertical sectional view similar to Figure 1 illustrating another embodiment of the invention which incorporates an inertia-responsive valve in the piston as well as in the bottom of the cylinder; and Figures 20, 21, 22 and 23 are transverse sectional views showing the orientations of the inertia-responsive piston valves, respectively, in the left-front, right-front, left-rear and right-rear shock absorbers of a vehicle.

As shown in Figures 1 and 2, the first embodiment of the invention comprises a hydraulic shock absorber, generally designated by the numeral 20, which is of a well known type adapted for mounting between the body and a wheel axle of a vehicle. The shock absorber 20 has the usual hydraulic chamber 22 which expands in response to elongation or upward extension of the shock absorber and contracts in response to contraction or downward retraction of the shock absorber. As will be explained, suitable inertia-responsive valve means controls the rate of release of hydraulic fluid from the chamber 22.

In the construction shown, the hydraulic chamber 22 is the interior portion of an upright cylinder 24, which portion extends below a piston 25. The cylinder 24 is formed with a fitting 26 at its lower end and a piston rod 28 that extends upward from the piston 25 terminates in a similar fitting (not shown), these two fittings being utilized for mounting the shock absorber on a vehicle in a well known manner. United with the lower end of the cylinder 24 is a larger concentric cylinder 30 providing an annular reservoir 32 for the hydraulic fluid, the lower end of the cylinder 24 having suitable peripheral ports 34 (Figure 3) for communication with this reservoir.

It is contemplated that the piston 25 will be provided with a suitable restricted orifice for a minimum rate of fluid flow therethrough, and will be additionally provided with both a release valve and a rebound valve. The release valve opens for increased upward flow through the piston and the rebound valve opens for increased downward flow. In the construction shown, the piston 25, which is integral with the piston rod 28, has an orifice 35 which is constantly open for fluid flow through the piston at a predetermined rate. The release valve for increased upward flow when desired, comprises a ring-shaped release-valve member 36 which normally closes the upper end of a peripheral passage 38 through the piston. This ring-shaped release-valve member 36, which may be provided with a suitable O-ring 40, is urged downward by a suitable helical spring 42. The lower end of the spring 42 seats in an annular recess 44 in the ring-shaped release-valve member 36 and the spring is confined at its upper end by a suitable keeper 45 that is fixedly mounted on the piston rod 28. The rebound valve in the piston 25 comprises a rebound-valve member in the form of a flat ring 46 which is slidingly mounted on a stud 48 in a circular recess 50 on the underside of the piston. The ring-shaped rebound-valve member 46 normally cuts off fluid passages 52 through the piston, the valve member being urged towards its closed position by a suitable spring 54 that sets against a flange 55 on the lower end of the stud 48.

The interior of the cylinder 24 is spanned by a web 56 (Figure 3) that forms the bottom of the chamber 22, and both a suitable blow-off valve and a suitable refill valve are mounted in this web to control fluid flow between the hydraulic chamber 22 and the reservoir 32 through the peripheral ports 34. The blow-off valve may comprise a blow-off valve member 58 that normally closes a valve port 60 in a cylindrical insert 62 that is fixedly mounted in the web 56. The blow-off valve member 58 comprises a disc having a stem 64 surrounded by a suitable spring 65 that urges the valve to closed position.

The refill valve in the web 56 comprises a refill-valve member 70 that normally rests in a tapered valve seat 72 to close a passage 74 through the web. The refill-valve member 70 has a stem 75 surrounded by a suitable spring 76. The upper end of the spring 76 seats against the web 56 and the lower end of the spring seats against a split retaining ring 78 on the stem 75 to urge the valve member 70 to closed position.

The spring 76 of the refill valve is relatively light to permit the refill valve member 70 to open at relatively low pressure. The spring 65 of the blow-off valve is relatively heavy to cause the blow-off valve member 58 to open in response to fluid pressure that is between two and three times the pressure required to unseat the release-valve member 36. By virtue of this arrangement, the hydraulic fluid will flow upward through the release valve of the piston at a lower pressure than it will flow through the blow-off valve into the reservoir 32, the space in the cylinder 24 above the piston 25 will be full of hydraulic fluid at all times, and only the fluid displaced by the piston rod 28 will flow through the blow-off valve when the shock absorber contracts. Thus the blow-off valve member 58 controlled by the spring 65 limits the rate of downward movement of the piston 25 in response to forces tending to contract the shock absorber.

The structure described to this point is conventional. The invention is directed to additional valve means to restrict the rate of flow through the blow-off valve in response to inertia and acceleration forces.

In the construction shown in Figures 1 to 7, an inertia-responsive valve, generally designated 80, controls flow from the hydraulic chamber 22 to the previously mentioned port 60 of the blow-off valve. The inertia-responsive valve 80 comprises a valve body 82 formed with a lateral tubular extension 84 that is mounted in a bore 85 in the previously mentioned cylindrical insert 62 thus placing the valve body in communication with the blow-off valve port 60. The valve body 82 has an enlarged axial fluid passage 86 in which a valve member in the form of a ball 88 is free to move in response to inertia. The valve body 82 is inclined so that the ball 88 seeks a normal open position at the lower end of the inclined fluid passage 86, the ball resting against a retaining ring 90.

It will be noted that when the ball 88 is at its normal open position shown in Figure 3, the ball is positioned below a pair of radial inlet ports 92. Thus there is freedom for fluid flow from the hydraulic chamber 22 through the inlet ports 92, the fluid passage 86 and the tubular extension 84 to the port 60 of the blow-off valve. It is apparent, that this freedom for fluid flow permits the piston 25 to displace fluid freely from the hydraulic chamber 22 into the reservoir 32 in response to normal shock loads imposed on the piston rod 28. If, however, the ball 88 is subject to inertia of a substantial magnitude in the upwardly inclined direction of the fluid passage 86, the ball 88 will roll up the passage into contact with a valve seat 93 to restrict or cut-off fluid flow from the hydraulic chamber 22 to the reservoir 32 through the blow-off valve port 60.

In Figure 4, which represents the left-front shock absorber of a set of four shock absorbers, the upwardly inclined direction of the fluid passage 86, in effect, lies in the left-front quadrant, i.e. its direction of response to inertia is in the right angle between the left direction and the forward direction relative to the longitudinal axis of the vehicle. It is apparent that the ball 88 will move from its normal open position to its upper closed position both in response to forward components of inertia and in response to leftward components of inertia.

In like manner, the right-front shock absorber, represented by Figure 5, has its fluid passage 86 oriented for movement of its ball 88 in the right-forward quadrant. It is apparent that in this right-front shock absorber, the ball 88 will respond to an effective forward component of inertia and will also respond to a rightward component of inertia.

The two rearward shock absorbers, represented by Figures 6 and 7, have their fluid passages 86 oriented in rearward quadrants. Thus in Figure 6, representing the left-rear shock absorber, the ball 88 will move from its normal open position to its closed position either in response to a rearward component of inertia or in response to a leftward component of inertia. In like manner, the ball 88 in Figure 7, representing the right-rear shock absorber, will respond either to a rearward component of inertia or to a rightward component of inertia.

The manner in which the four shock absorbers represented by Figures 4 to 7 cooperate for their purpose will be readily understood from the foregoing description. If the vehicle is suddenly and severely accelerated, as from a standing start, the two rear shock absorbers shown in Figures 6 and 7 tend to contract vertically to an excessive degree with consequent flow of fluid through their blow-off valves into their reservoirs 32. Such sudden excessive contraction of the two rearward shock absorbers is prevented, however, because the corresponding balls 88 respond to the rearward inertia by moving up the rearwardly inclined fluid passages 86 to the corresponding valve seats 93 to cut off fluid flow to the corresponding blow-off valve ports 60. Only the rearward pair of shock absorbers respond in this manner to the sudden forward acceleration of the vehicle.

Whenever the brakes are applied suddenly or severely the two forward shock absorbers represented by Figures 4 and 5 tend to collapse, thereby causing the vehicle body to "nose dive." The vehicle body is prevented from making such an excessive forward dip, however, by the action of the two forward balls 88, both of which respond to the forward inertia by moving up the inclined fluid passages 86 to the corresponding valve seats 93 to cut off flow to the blow-off valve ports 60. The two rearward shock absorbers represented by Figures 6 and 7 are not affected by such deceleration on a straight run.

Whenever the vehicle rounds a curve at relatively high speed the balls 88 in the two outer shock absorbers respond to inertia or centrifugal force by restricting or cutting off fluid flow to the corresponding blow-off valves. Thus in making a severe left hand turn, the inertia will be rightward and the balls 88 of the two shock absorbers on the right hand side of the vehicle represented by Figures 5 and 7, will respond to the rightward components of force to check the tendency of the vehicle body to sway or dip to the right. In like manner, the two left hand shock absorbers, represented by Figures 4 and 6, will respond to the leftward inertia to check the outward sway or dip of the vehicle body when the vehicle makes a sharp right turn at a relatively high speed.

In Figures 4 to 7, the upwardly inclined fluid passages 86 of the four shock absorbers are at approximately the mid points of their quadrants, i.e. at 45° from the longitudinal axis of the vehicle, so that the balls 88 are approximately equally responsive to longitudinal inertia and lateral inertia. It is apparent, however, that the fluid passages 86 may be turned away from the 45° positions in their quadrants. Thus if the fluid passages are oriented to less than 45° from the longitudinal axis of the vehicle the responsiveness of the balls 88 to longitudinal components of inertia will be increased and the responsiveness to lateral components of inertia will be decreased. In like manner, orienting the fluid passages 86 to greater than 45° from the longitudinal axis of the vehicle will correspondingly increase the responsiveness of the balls 88 to lateral components of inertia and correspondingly decrease the responsiveness to longitudinal components of inertia.

It is further apparent that the inclination from horizontal of the various fluid passages 86 may be varied thereby to vary the sensitivity of the balls 88 to inertia. Thus if the inclination of the fluid passages 86 relative to horizontal is decreased, the balls 88 will more readily move to their closed positions in response to inertia and the sensitivity of the four shock absorbers to inertia will be increased.

It is apparent that the inertia-responsive valves 80 may be added to existing shock absorbers at relatively small cost. In this respect, a feature of the invention is that the additional valve structure occupies relatively little additional space.

A certain problem may arise since the closing of the inertia-responsive valve 80 completely blocks fluid flow from the hydraulic chamber 22 to the reservoir 32 and, in effect, causes the shock absorber to become a rigid structure. Thus when a large sudden increase of force tending to collapse the shock absorber occurs, for example, when the right front wheel hits a bump when the vehicle is making a sharp left turn at high speed, the rigidity of the shock absorber may cause an axle to break or a tire to blow out. In the present embodiment of the invention, this problem is met by incorporating means to make the shock absorber yieldable to shock forces of exceptionally high magnitude.

This objective is attained by placing a hollow yieldable body inside the cylinder 24 that is capable of contracting substantially in volume but does so only in response to exceptionally high magnitude pressure. Thus Figures 1 and 2 show how a doughnut-shaped hollow neoprene body 94 may be positioned in the cylinder 24 around the piston rod 28 above the piston rod flange 45. During operation of the shock absorber by forces of normal magnitude the hollow body 94 maintains substantially the configuration shown in Figure 1. When, however, a shock force occurs of such high magnitude as may cause damage while the inertia-responsive valve 80 is closed, the hollow body 94 yields by volumetric contraction as shown in Figure 2 to absorb an effective proportion of the shock force. When the shock force terminates the hollow body 94 expands back to its original state. Thus the contraction of the hollow body permits the piston 25 to move, even though the inertia-responsive valve 80 is closed, and the subsequent expansion of the hollow body 94 back to its normal volume causes the piston to return upward to its normal position.

The flow-responsiveness of each of the valve balls 88 in the four shock absorbers may be understood by reference to Figures 4–7. It can be seen that the fluid passage 86 serves as a cage for the valve ball 88, the valve seat 93 being at one end of the cage and the opposite end of the cage being open. When the hydraulic chamber 22 is contracted, the hydraulic fluid displaced therefrom enters the valve cage through the lateral inlet ports 92 to flow through the valve seat 93 to the blow-off valve port 60. Since the valve seat 93 is a restriction relative to the cross sectional area of the valve cage there is a local increase in velocity with corresponding decrease in local pressure, consequently, a pressure differential is created across the valve ball in the direction of the valve seat 93.

For a given restriction of the fluid stream by the valve seat 93, the venturi effect and consequent pressure differential across the ball 88 depends, among other things, on the diameter of the valve cage, the length of the valve cage and the size of the ports 92. In general, the responsiveness of the valve ball 88 to the flow of the hydraulic fluid is increased by decreasing the diameter of the valve cage, by shortening the valve cage, and by decreasing the size of the inlet ports 92. These factors may be selected for a venturi effect that will make the valve close by flow-responsiveness alone only when the fluid flow is both rapid and relatively prolonged, the valve remaining open if the fluid flow is either relatively brief or relatively slow.

When the vehicle makes an exceptionally rapid start from a stationary position or makes an abrupt stop, the collapsing action of the affected shock absorber chambers is both severe and relatively prolonged so that the venturi effect as well as inertia acts on the valve balls to result in extremely rapid valve-closing operations. In the same manner whenever the vehicle rounds a curve at relatively high speed, the affected shock absorber chambers tend to collapse rapidly with consequent venturi effect to supplement the inertia-responsiveness of the valve balls.

An important advantage of this particular embodiment of the invention illustrated by Figures 1–7 is that the fluid passage 86 that forms the valve cage is inclined from the horizontal so that the valve ball 88 is also responsive to vertical inertia forces. Thus if the valve cage is abruptly lifted the ball 88 tends to remain at its open position by inertia and if the cage is abruptly lowered the ball tends to move to its closed position by inertia.

When the vehicle wheel associated with a particular shock absorber strikes a relatively small bump on a straight road, for example, when the vehicle travels over a "washboard" road surface, there is a consequent short rapid collapse of the shock absorber but the brief venturi effect is not sufficient to cause closing action of the valve ball. Thus the inertia-responsive valve member does not interfere with the desired "soft" riding quality of the shock absorber.

If a wheel on a straight road encounters a relatively large sloping bump, first, there is a rapid and extensive collapse of the shock absorber as the wheel climbs up the large bump; then there is a rapid and extensive lengthening of the shock absorber as the wheel rides down the far side of the bump; and, finally, the vehicle body which has been elevated to a slight extent by the encounter with the bump settles down to its normal level with consequent partial collapse of the extended shock absorber. For a desirably "soft" ride it is essential that the ball 88 remain in its open position during the initial rapid collapse of the shock absorber as the wheel climbs the large bump. Ordinarily the venturi effect created by such a rapid and extensive collapse of the shock absorber would be sufficient to cause the valve ball to be moved quickly to its closed position, but in this instance the bottom portion of the shock absorber is abruptly lifted in the collapsing action and the vertical inertia force involved tends to keep the ball at its lower open position. Thus, with the valve passage 86 inclined upward the inertia-responsiveness of the ball opposes and cancels its flow-responsiveness to a sufficient extent to permit the desired free collapse of the shock absorber.

As the wheel drops down the far side of the large bump, the abrupt downward movement of the ball cage tends to cause the valve ball to move to its closed position by inertia, but the flow of the hydraulic fluid involved in the extension of the shock absorber is against the valve ball in a direction to hold the valve ball in its open position.

As the wheel of the vehicle starts down the far side of a long, sloping bump, the compressed spring forces the wheel downward, and tends to hold the body upward, thus extending the shock absorber and spring. As the wheel levels off, the body "falls" upon the springs, thus rapidly collapsing the shock absorber, but the venturi effect closes the inertia valves, and stiffens all four shock absorbers, thus preventing the vehicle from "butting bottom" as would be the case without the added resistance provided by the closed inertia valves.

Figure 8 shows how this first embodiment of the invention may be modified if desired. One modification consists of changing the position of the inertia-responsive valve 80a to make the fluid passage 86 substantially horizontal. A suitable light spring 95 is added to bias or urge the ball 88 towards its normal open position. One end of the spring rests against the ball 88 and the other end seats in an annular recess 96 adjacent a valve seat 93a.

Figure 8 further shows the addition of a normally closed release valve, generally designated 97, that is in parallel with the inertia valve 80a with respect to fluid flow from the hydraulic chamber 22 into the reservoir 32. The release valve 97 comprises a tubular insert 98 in the bottom wall or web 56 of the shock absorber, the tubular insert providing a valve seat 100 at its upper end for a release-valve ball 102. The release-valve ball 102 is normally held against the valve seat 100 by a suitable coil spring 104 that is in compression between the ball and a ring 105 at the bottom of the insert.

The normally closed release valve 97 is a high pressure valve that opens only in response to forces of exceptionally high magnitude. When a large sudden increase of force tending to collapse the shock absorber occurs, for example when the right-front wheel hits a large bump while going around a lefthand turn at high speed, the release valve 97 opens so that the severe force will not break the axle or cause the tire to blow out. Thus the release valve 97 in Figure 8 serves the same purpose as the hollow body 94 shown in Figures 1 and 2.

The second embodiment of the invention shown in Figures 9 to 15 is largely identical with the first embodiment as indicated by the use of corresponding numerals to designate corresponding parts. The essential difference lies solely in the construction of an inertia-responsive valve that is generally designated by the numeral 110, this valve corresponding in function to the previously described inertia-responsive valve 80.

The inertia-responsive valve 110 requires more vertical space in the hydraulic chamber 22 and therefore this embodiment of the invention employs a relatively tall cylindrical insert 62a instead of the previously described relatively short cylindrical insert 62. The insert 62a incorporates the usual blow-off valve member 58 which normally closes a blow-off valve inlet passage 112.

The inertia-responsive valve 110 has the usual lateral tubular extension 114 which is mounted in a radial bore 115 in the cylindrical insert 62a to place the inertia-responsive valve in communication with the blow-off valve passage 112. The body of the inertia-responsive valve 110 has two portions 116 and 118 extending at 90° to each other and thus provides an angular fluid passage having two corresponding portions 120 and 122 at 90° relative to each other. Preferably, for purpose of ease of fabrication, the two valve body portions 116 and 118 are made in two separate parts that are joined by screw threads as shown in the drawing. The two body portions 116 and 118 are both inclined from the vertical as indicated in Figures 9 and 10 to cause corresponding inclination of the two fluid passage portions 120 and 122.

What may be termed a first valve member in the form of a ball 124 is movably mounted in the fluid passage portion 120 and by virtue of the inclination of this fluid passage this ball 124 is normally at the lower end of the passage in abutment against a stop 125, as shown in Figures 12 and 15. The upper end of the fluid passage portion 120 is provided with a valve seat 126 against which the ball 124 moves in response to inertia to completely cut off flow through the valve body. When the ball 124 is in its normal retracted position, fluid may flow readily past the ball by virtue of the fact that the fluid passage portion 120 is provided with a plurality of longitudinal grooves 128 of liberal aggregate flow capacity, as shown in cross section in Figure 11.

The second fluid passage portion 122 movably confines a second valve member in the form of a second ball 130 and this second fluid passage portion is inclined so that the ball 130 normally seeks an open position against a retaining ring 132. At the alternate closed position of the second ball 130, it abuts a valve seat 134 to keep fluid from flowing from the second fluid passage portion 122 through a port 135 into the first fluid passage portion 120. On the other hand, when the second ball 130 is in its normal retracted position shown in Figures 12 to 15, fluid from the hydraulic chamber 22 may enter the passage portion 122 through a pair of radial ports 136 and flow into the first fluid passage portion 120.

From the foregoing description it is apparent that when the two balls 124 and 130 are in their normal open positions shown in Figures 12 to 15, there is free fluid communication between the hydraulic chamber 22 and the blow-off valve inlet passage 112, the path of communication including: the radial ports 126, fluid passage portion 122, valve port 135, longitudinal grooves 128 in the fluid passage portion 120, and lateral tubular extension 114. It is further apparent that the two balls 124 and 130 are in series in the sense that fluid flow through the inertia valve 110 is completely cut off whenever either one of the two balls is moved to its closed position.

In Figure 12, which represents the left-front shock absorber of a set of four shock absorbers, the first ball 124 is movable to its closed position in response to leftward inertia and the second ball 130 is movable to its closed position in response to forward inertia. Thus the orientation of the angular fluid passage comprising the two passage portions 120 and 122 may be said to lie in the forward left quadrant. It is apparent that the inertia-responsive valve 110 closes in response to either a leftward component of inertia or a forward component of inertia.

In like manner, the right-front shock absorber represented by Figure 13 is oriented to respond to inertia in the direction of the right-front quadrant, the first ball 124 moving to closed position in response to rightward inertia and the second ball 130 moving to its closed position in response to forward inertia.

The two rearward shock absorbers represented by Figures 14 and 15 are oriented to respond to inertia in the directions of the rearward quadrants. Thus in Figure 14, the first ball 124 cuts off fluid flow in response to leftward inertia. In like manner, the first ball 124 in Figure 15 cuts off flow in response to rightward inertia and the second ball 130 cuts off flow in response to rearward inertia.

The manner in which the four shock absorbers shown in Figures 12 to 15 cooperate for their purpose may be readily understood. If the vehicle is suddenly and severely accelerated, as from a standing start, the two rearward shock absorbers shown in Figures 14 and 15 tend to contract excessively with corresponding flow of fluid through their blow-off valves to their reservoirs 32. Such sudden contraction of the two rearward shock absorbers is prevented, however, because the two balls 130 therein respond to the rearward inertia by moving rearward to their closed positions for cutting off the escape of fluid from the hydraulic chamber 22 to the reservoir 32. It is apparent that only the rearward shock absorbers respond in this manner.

Whenever the brakes are applied suddenly or severely, the two forward shock absorbers represented by Figures 12 and 13 tend to collapse, thereby causing the vehicle body to sway forward. The vehicle body is prevented from swaying forward, however, by the action of the two balls 130 in the forward shock absorbers, both of which move forward to cut off fluid flow. The two rearward shock absorbers represented by Figures 14 and 15 are not affected.

Whenever the vehicle rounds a curve at relatively high speed the balls 124 in the two outer shock absorbers respond to centrifugal force by moving to their closed positions to cut off fluid flow to the corresponding blow-off valves. Thus in making a severe left hand turn, the centrifugal force will be rightward and the two balls 124 of the two right shock absorbers shown in Figures 13 and 15 will move rightward to their closed positions to check the tendency of the vehicle body to sway to the right. In like manner, the two left hand shock absorbers represented by Figures 12 and 14 will respond to the leftward inertia by movement of the corresponding balls 124 leftward to their closed positions to check the outward sway of the vehicle body when the vehicle makes a sharp right turn at a relatively high speed.

It is apparent that the responsiveness of the various balls 130 and 124 to inertia may be varied by varying the inclination to the fluid passage portions in which they move. Thus the inclination of the valve body portions 116 may be varied to vary the inertia responsiveness of the balls 124 and the inclination of the body portions 118 may be varied to vary the inertia-responsiveness of the balls 130.

It will be apparent that this second embodiment of the invention shown in Figures 9 to 15 may either be provided with the hollow yieldable body 94 shown in Figures 1 and 2 or be provided with the high pressure release valve 97 shown in Figure 8.

Since the fluid passages that serve as ball cages in this second embodiment of the invention are inclined, the ball members are responsive to vertical inertia forces as well as to inertia forces longitudinally and laterally of the vehicle. It is apparent that the ball members act in the manner heretofore described when the vehicle encounters a relatively large bump on a straight road.

Figures 16 to 18 show how the second embodiment of the invention shown in Figures 9 to 15 may be modified if desired. The modification consists of orienting both of the fluid passage portions 120 and 122 horizontally and in the further addition of springs 138 and 140 to bias the two balls 124 and 130 respectively to their closed positions. The spring 138 is confined between the ball 124 and an annular recess 142 and in like manner the spring 140 is confined between the ball 130 and an annular recess 144.

It is apparent that this modification functions in the same manner as the form of the invention shown in Figures 9 to 15. The two passage portions 120 and 122 may be inclined, if so desired, to modify the sensitivity of the two balls to inertia.

The embodiment of the invention illustrated by Figures 19–23 is, in large part, identical with the first described embodiment of the invention, as indicated by the use of corresponding numerals to indicate corresponding parts. The structure at the bottom of the cylinder 24 remains unchanged. Thus, the botom structure includes the usual refill passage 74 controlled by a refill valve member 70, the usual blow-off port 60 controlled by a blow-off valve member 58, and an inertia-responsive valve 80 having the usual inertia-responsive valve ball therein.

This last embodiment of the invention differs from the first embodiment in the provision of an inertia-responsive valve in the construction of the shock absorber piston. The shock absorber piston 145 in Figure 19 divides the interior of the cylinder 24 in the usual manner into a lower hydraulic chamber 22 that contracts in volume when the shock absorber contracts in length and an upper hydraulic chamber 146 that contracts in volume when the shock absorber increases in length.

The piston 145 is provided with an inertia-responsive valve, generally designated 150, which under certain circumstances closes automatically to resist escape of the hydraulic fluid from the upper hydraulic chamber 146. Preferably the upper hydraulic chamber 146 encloses a previously described doughnut-shaped hollow body 94 that collapses under relatively high pressure. This hollow body surrounds the piston rod 152 and preferably the piston rod is provided with a flange 154 to keep the hollow body spaced well above the piston 145.

In the construction shown in Figure 19, the piston 145 is a cup-shaped member formed with both an inner circular series of fluid passages 156 and an outer circular series of fluid passages 158 for fluid flow through the piston. Downward fluid flow through the outer fluid passages 158 may be prevented by what may be termed a high-flow check valve comprising a thin ring-shaped valve member 160 that is dimensioned to cover the outer fluid passages 158 but not to cover the inner fluid passages 156. The ring-shaped valve member 160 is normally held in closed position by the radial arms of a leaf-spring spider 162. Upward flexure of the arms of the leaf-spring spider 162 is limited by a stop ring 164 that is provided with a number of apertures 165 for minimum interference with fluid flow. In the construction shown, the apertured stop ring 164 is backed against a circumferential shoulder of the piston rod 152 and the leaf-spring spider 162 is clamped between the stop ring 164 and the piston 145. The piston 145, in turn, is held against the leaf-spring spider 162 by a special bushing 166 that threads onto the end of the piston rod 152.

Upward fluid flow through the inner fluid passages 156 of the piston 145 is prevented by a ring-shaped check valve member 168 which may be aptly termed a high-pressure release valve. This release valve member 168 is normally held in closed position by a relatively heavy spring 170 in compression between the release valve member and a circumferential flange 172 on the lower end of the special bushing 166.

A further passage is provided in the piston rod 152 for downward flow of hydraulic fluid from the upper chamber 146 when the piston 145 rises. For this purpose the piston rod 152 is provided with an axial bore 174 from its lower end and a communicating bore 175 above the piston 145. Preferably but not necessarily, what may be termed a medium-pressure release valve is provided in this fluid passage. To this end, the piston rod is counterbored to form a valve seat for a medium-pressure release valve member 178. The valve member 178 is normally held in closed position by a suitable spring 180 in compression between the valve member and an inner radial flange 182 of the special bushing 166. Preferably the valve member 178 has a relatively small bore 184 therethrough to permit a relatively low rate of flow when the valve member is closed.

The previously mentioned inertia-responsive valve 150 carried by the piston also controls flow through the axial bore or passage 174. In the usual manner, the inertia-responsive valve 150 includes a valve body 185 that serves as a cage for an inertia-responsive valve ball 186, the valve cage having a lateral cylindrical extension 188 by means of which it is mounted in the previously mentioned radial bore 175 of the piston rod. The valve body 185 has a plurality of longitudinal slots 190 that serve as fluid inlets and an end portion 192 of the valve body is bent over to prevent escape of the valve ball 186.

During normal straight-ahead driving when only a moderate collapse of the shock absorber is caused by a moderate shock force the piston 145 moves downward and the high-flow check valve member 160 opens in opposition to the leaf spring spider 162 to permit free upward flow of the hydraulic fluid through the outer piston passages 158. Additional fluid flows upward through the aperture 184 in the medium-pressure release valve member 178. The medium-pressure release valve 178 and the high-pressure release valve 168 both remain closed. Since the downward movement of the piston 145 involves the introduction of an increasing proportion of the piston rod 152 into the cylinder 24, the blow-off valve member 58 opens to permit a corresponding amount of the hydraulic fluid to be discharged into the reservoir 32.

When the piston 145 moves upward with moderate extension of the shock absorber during normal straight-ahead driving, the high-flow check valve member 160 and the high-pressure release valve member 168 both remain closed but the medium-pressure release valve member 178 opens to permit relatively free downward flow of hydraulic fluid from the upper chamber 146 through the piston. Since the upward movement of the piston 145 involves withdrawal of a portion of the piston rod 152 from the interior of the cylinder 24, the refill valve member 70 opens to admit fluid into the cylinder from the reservoir 32.

The inertia-responsive valve 150 in the piston 145 is not affected by the normal moderate shock forces involved in straight-ahead travel of the vehicle but may be closed by the effect of inertia when the vehicle makes an abrupt start or an abrupt stop or an abrupt turn. For example, when the vehicle makes a sharp left turn, a shock absorber on the left side of the vehicle tends to lengthen rapidly and extensively but is prevented from doing so by inertia causing the valve ball 186 to move to its closed position to block downward flow through the piston rod passage 174. The consequent increase in pressure in the upper hydraulic compartment 146 causes the hollow body 94 to collapse and then, as the pressure rises still higher, the high-pressure release valve member 168 opens in apposition to the spring 170 to keep the pressure from reaching a destructive magnitude.

Consider a vehicle equipped with four shock absorbers such as shown in Figure 19 with inertia-responsive valves 80 in the cylinders and with inertia-responsive valves 150 in the pistons. The inertia-responsive valves 80 in the shock absorber cylinders are oriented as heretofore described and as shown in Figures 4, 5, 6 and 7, respectively. The inertia-responsive valves 150 in the pistons are oriented as shown in Figures 20, 21, 22 and 23 for the left-front, right-front, left-rear, and right-rear locations, respectively. It will be noted that the inertia-responsive valves 150 in the pistons are oriented in the same quadrants as the inertia-responsive valves in the cylinders but operate in contrary directions. Thus, the ball 90 in Figure 4 and the ball 186 in Figure 20 move along similar diagonal paths but the ball 90 moves forward to cut off flow and the valve 186 moves rearward to cut off flow.

When the vehicle equipped with the four described shock absorbers is abruptly stopped or decelerated, the two front shock absorbers tend to collapse severely and the two rear shock absorbers tend to extend severely but the inertia-responsive valves 80 are operated by inertia to prevent drastic collapse of the two front shock absorbers and the inertia-responsive valves 150 of the two rear shock absorbers close by inertia to prevent extensive lengthening of the two rear shock absorbers. In the same manner when the vehicle is abruptly accelerated, the inertia-responsive valves 80 in the two rear shock absorbers prevent excessive lowering of the rear end of the vehicle and the inertia-responsive valves 150 in the pistons of the two front shock absorbers prevent excessive rise of the front end of the vehicle.

When the vehicle makes a sharp left turn, the valves 80 in the cylinders of the two right shock absorbers act under inertia to prevent excessive lowering of the right side of the vehicle and at the same time, the valves 150 in the pistons of the left shock absorbers act under inertia to prevent excessive rise of the left side of the car. The same kind of valve operations are involved in a sharp right turn.

If desired, some of the shock absorbers on a vehicle may have inertia-responsive valves only in the cylinders and other shock absorbers may have inertia-responsive valves only in the piston. In one practice of the invention that has important advantages the front shock absorbers have inertia-responsive valves of the character described in both cylinders and the pistons while the two rear shock absorbers have inertia-responsive valves in the pistons only.

My description in specific detail of the selected embodiments of the invention will suggest various changes, substitutions and other departures from my disclosure within the spirit and scope of the appended claims.

I claim:

1. Means to reduce the inertia-responsiveness of a vehicle body that is yieldingly mounted on ground wheels, comprising four shock absorbers located, respectively, at the left-front, right-front, left-rear, and right-rear regions of the body to resist vertical movements of the body relative to the ground wheels, each of said shock absorbers having a closed self-contained hydraulic system including at least one chamber that contracts with contraction of the shock absorber with a portion of the wall of the chamber fixed relative to the axis of the corresponding ground wheel for upward and downward movement with the ground wheel, each of said shock absorbers having means to at least retard fluid flow out of said chamber thereby to create resistance to contraction of the chamber, each of said means comprising a fluid passage forming a valve seat and a valve member movable along the fluid passage by inertia from a normal open position to at least a partially closed position at said valve seat, each of said fluid passages being oriented at an acute angle to the longitudinal axis of the vehicle for response both to inertia forces laterally of the vehicle and to inertia forces longitudinally of the vehicle, the fluid passages in the shock absorbers at the forward end of the vehicle being oriented relative to the longitudinal axis of the vehicle for valve-closing operation in response to inertia to oppose forward inertia sway of the vehicle, the fluid passages in the shock absorbers at the rear of the vehicle being oriented relative to the longitudinal axis of the vehicle for valve closing operation in response to inertia to oppose rearward inertia sway of the body, the fluid passages in the shock absorbers on one side of the vehicle being oriented relative to the longitudinal axis of the vehicle for valve closing operation in response to inertia to oppose inertia sway of the body towards said one side, and the fluid passages in the shock absorbers on the other side of the vehicle being oriented relative to the longitudinal axis of the vehicle for valve closing operation in response to inertia to oppose inertia sway of the body towards said other side.

2. A combination as set forth in claim 1 in which each of said valve members is a ball member free to roll longitudinally along the corresponding fluid passage.

3. A combination as set forth in claim 1 in which each of said shock absorbers includes spring means to bias the corresponding valve member towards its normal open position.

4. A combination as set forth in claim 1 in which said fluid passages of the shock absorbers are inclined for gravitationally biasing the corresponding valve members towards their normal open positions.

5. A combination as set forth in claim 1 in which each of said valve members is positioned to be influenced by the fluid flow to said valve seat when said chamber contracts whereby such flow exerts force on the valve member in the direction of the valve seat.

6. A combination as set forth in claim 1 in which each of said shock absorbers has a normally closed release valve in parallel with the corresponding inertia-responsive valve, said release valve being responsive only to exceptionally high fluid pressure to function only when an exceptionally high magnitude load is imposed on said chamber while the corresponding inertia-responsive valve is closed.

7. A combination as set forth in claim 1 in which each of the shock absorbers confines a hollow resilient body immersed in the hydraulic fluid for contraction in volume in response to exceptionally high fluid pressure in the shock absorber.

8. The combination with a vehicle having a body yieldingly mounted on ground wheels of four hydraulic shock absorbers located respectively at the left-front, right-front, left-rear, and right-rear of the vehicle, each of said shock absorbers having a valve to oppose the fluid flow therein involved in the local downward movement of the body, each of said valves comprising a fluid passage formed with a valve seat and at least one valve member freely movable in the fluid passage longitudinally thereof by inertia between a normal open position and a second closed position, each of said fluid passages being at an acute angle relative to the longitudinal axis of the vehicle, each of said valve members being biased towards its normal open position, the fluid passages in the two forward shock absorbers being oriented relative to the longitudinal axis of the vehicle for closing action by the corresponding valve members in response to forward inertia force, the two rearward hydraulic shock absorbers being oriented relative to the longitudinal axis of the vehicle for closing action by the corresponding valve members in response to rearward inertia force, the two left shock absorbers being oriented relative to the longitudinal axis of the vehicle for closing action by the corresponding valve members in response to leftward inertia force, and the two right shock absorbers being oriented relative to the longitudinal axis of the vehicle for closing action by the corresponding valve members in response to rightward inertia force.

9. A combination as set forth in claim 8 in which each of said fluid passages is inclined downward towards the open position of the valve member whereby downward inertia force tends to keep the valve member at its open position when the fluid passage is abruptly lifted.

10. Means to reduce the inertia-responsiveness of a vehicle body as set forth in claim 1 in which said fluid passage in each of said shock absorbers is shaped and dimensioned for the flow of hydraulic fluid therethrough to urge said valve member towards its closed position whereby the inertia of the valve member opposes the flow responsiveness of the valve member to keep the valve member in open position for free contraction of said chamber when the corresponding ground wheel rises abruptly over an obstacle and as the ground wheel levels off beyond the obstacle with the chamber expanded, the inertia of the valve member is not effective to oppose the flow responsiveness of said valve member and the valve member moves to said seat to prevent sudden collapse of the chamber.

11. Means to reduce the inertia-responsiveness of a vehicle body as set forth in claim 10 in which said fluid passage is restricted at said valve seat and is shaped and dimensioned to create a venturi effect for placing a pressure differential across the valve member in the direction of said valve seat to urge the valve member towards the valve seat in response to fluid flow through the valve seat.

12. Means to reduce the inertia-responsiveness of a vehicle body as set forth in claim 11 in which said valve member is a ball member free to roll along said passage and said passage has at least one lateral opening for admission of fluid from said chamber to the passage.

13. In a hydraulic shock absorber having a first portion for connection to a vehicle body and a second portion for connection to a ground wheel of the vehicle to function between the vehicle body and the ground wheel and having a chamber that contracts in response to lessening of the distance between said two portions with a restricted passage for release of hydraulic fluid from said chamber to permit collapse of the chamber, the improvement comprising: a valve seat in said passage; and a valve member movable in said passage into said valve seat to oppose contraction of said chamber, the path of closing movement of said valve member being inclined upward whereby the valve member normally gravitationally seeks an open position away from said valve seat and whereby inertia forces in the direction of inclination of said path urges the valve member towards the valve seat so that the shock absorber may be oriented for closing movement of the valve member in response to inertia forces, said passage being in said second portion of the shock absorber to move up and down with said ground wheel as the ground wheel climbs over obstacles whereby the inertia of said valve member tends to keep the valve member in its open position when said ground wheel moves upward abruptly over an obstacle.

14. The improvement as set forth in claim 13 in which said valve member is a ball member free to roll in said passage and in which said passage inclines upward towards said valve seat to provide said path for the ball member.

15. In a hydraulic shock absorber having a first portion for connection to a vehicle body and a second portion for connection to a ground wheel of the vehicle to function between the vehicle body and the ground wheel and having a chamber that contracts in response to lessening of the distance between said two portions with a restricted passage for release of hydraulic fluid from said chamber to permit collapse of the chamber, the improvement comprising: a valve seat in said passage; and a valve member movable in said passage into said valve seat to oppose contraction of said chamber, the path of closing movement of said valve member being inclined upward whereby the valve member normally gravitationally seeks an open position away from said valve seat and whereby inertia forces in the direction of inclination of said path urges the valve member towards the valve seat so that the shock absorber may be oriented for closing movement of the valve member in response to inertia forces, said passage being in said second portion of the shock absorber to move up and down with said ground wheel as the ground wheel climbs over obstacles whereby the inertia of said valve member tends to keep the valve member in its open position when said ground wheel moves upward abruptly over an obstacle, said passage being shaped and dimensioned and said valve member being positioned for the flow of hydraulic fluid through the passage to urge said valve member towards its closed position, whereby the inertia of the valve member opposes the flow responsiveness of the valve member to keep the valve member in open position for free contraction of said chamber when the ground wheel rises abruptly over an obstacle and as the ground wheel levels off beyond the obstacle with the chamber expanded, the inertia of the valve member is not effective to oppose its flow responsiveness and the valve member moves to said valve seat to prevent sudden collapse of the chamber.

16. The improvement as set forth in claim 15 in which said passage is restricted at said valve seat and is shaped and dimensioned to create a venturi effect for placing a pressure diffeerntial across the valve member in the direction of said valve seat to urge the valve member towards the valve seat in response to fluid flow through the valve seat.

17. The improvement as set forth in claim 16 in which said valve member is a ball member free to roll along said passage and said passage has at least one lateral opening for admission of fluid from said chamber to the passage.

18. Means to reduce the inertia-responsiveness of a vehicle body that is yieldingly monuted on ground wheels, comprising four shock absorbers located, respectively, at the left-front, right-front, left-rear, and right-rear regions of the body to resist vertical movements of the body relative to the ground wheels, each of said shock absorbers having a closed self-contained hydraulic system including a first hydraulic chamber and a second hydraulic chamber, said first chamber contracting with contraction of the shock absorber with a portion of the wall of the chamber fixed relative to the axis of the corresponding ground wheel for upward and downward movement with the ground wheel, said second chamber contracting with extension of the shock absorber on relatively upward movement of the vehicle body, each of said shock absorbers having means to at least retard fluid flow out of its first chamber thereby to create resistance to contraction of the chamber, each of said means comprising a fluid passage forming a valve seat and a valve member movable along the fluid passage by inertia from a normal open position to at least a partially closed position at said valve seat, each of said fluid passages being oriented at an acute angle to the longitudinal axis of the vehicle for response both to inertia forces laterally of the vehicle and to inertia forces longitudinally of the vehicle, the fluid passages in the shock absorbers at the forward end of the vehicle being oriented relative to the longitudinal axis of the vehicle for valve-closing operation in response to inertia to oppose forward inertia sway of the vehicle, the fluid passages in the shock absorbers at the rear end of the vehicle being oriented relative to the longitudinal axis of the vehicle for valve closing operation in response to inertia to oppose rearward inertia sway of the body, the fluid passages in the shock absorbers on one side of the vehicle being oriented relative to the longitudinal axis of the vehicle for valve closing operation in response to inertia to oppose inertia sway of the body towards said one side, and the fluid passages in the shock absorbers on the other side of the vehicle being oriented relative to the longitudinal axis of the vehicle for valve closing operation in response to inertia to oppose inertia sway of the body towards said other side, each of said shock absorbers having a valve means movable by inertia from an open position along a path to a position blocking flow from said second chamber, said paths in the two rear shock absorbers being oriented for closing of the corresponding valve means by inertia in response to sudden deceleration of the vehicle, said paths in the two front shock absorbers being oriented for the closing of the corresponding valve means by inertia in response to sudden acceleration of the vehicle, said paths in the left shock absorbers being oriented for closing of the corresponding valve means by centrifugal force when the vehicle makes a sharp left turn, and said paths in the two right shock absorbers being oriented for closing of the corresponding valve means by centrifugal force when the vehicle makes a sharp right turn.

19. A combination as set forth in claim 18 in which said two hydraulic chambers are separated by a piston and in which said valve means for blocking flow from said second chamber are mounted in said piston.

20. A combination as set forth in claim 1 in which each of said fluid passages is an angular fluid passage having a first portion and a second portion at an angle to the first portion; and which includes two valve members in said first and second portions respectively of the fluid passage, each of said valve members being freely movable by inertia from a normal open position to a second position to restrict the passage, whereby the shock absorber may be oriented for the valve member in one of said passage portions to respond to inertia forces longitudinally of the vehicle with the valve member in the other portion responding to inertia forces laterally of the vehicle.

References Cited in the file of this patent

UNITED STATES PATENTS

| | | |
|---|---|---|
| 2,144,583 | Focht | Jan. 17, 1939 |
| 2,182,272 | Armstrong | Dec. 5, 1939 |
| 2,722,288 | Steinbauer | Nov. 1, 1955 |
| 2,778,656 | May | Jan. 22, 1957 |
| 2,781,869 | Boehm et al. | Feb. 19, 1957 |

FOREIGN PATENTS

| | | |
|---|---|---|
| 125,863 | Australia | July 3, 1947 |